April 23, 1957 T. F. PETERSON 2,790,053
SHIELDED IGNITION CABLE AND RESISTORS
Filed Dec. 27, 1951 3 Sheets-Sheet 1
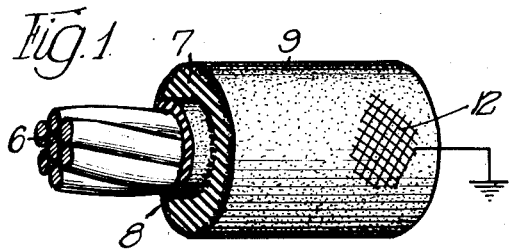
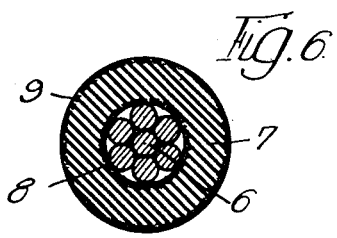
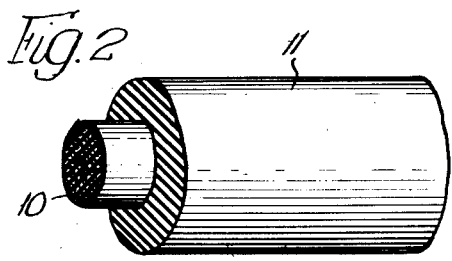
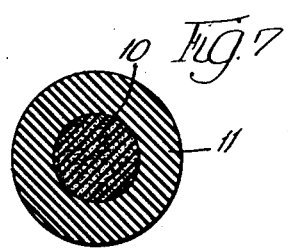
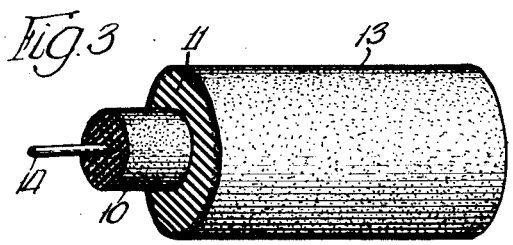
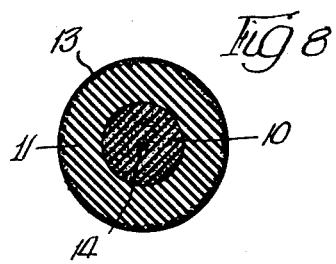
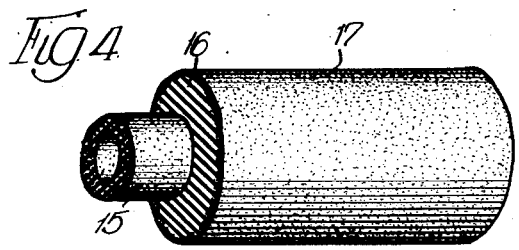
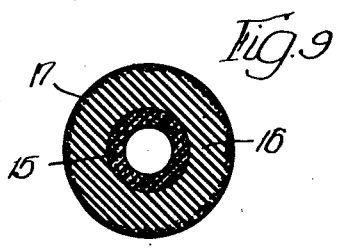
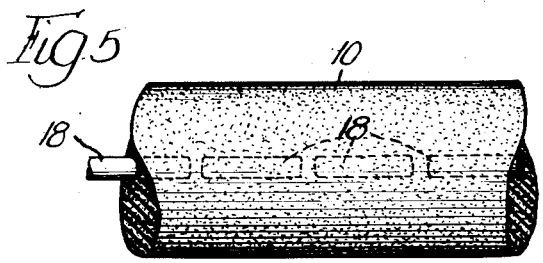
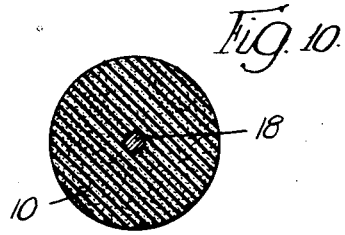
INVENTOR.
Thomas F. Peterson,
BY
Wilkinson, Huxley, Byron & Hume
ATTYS

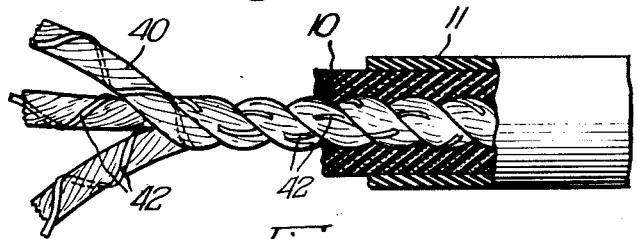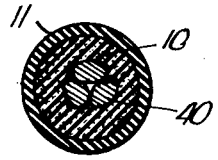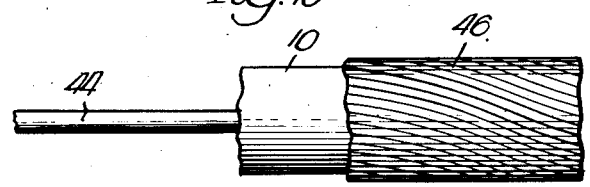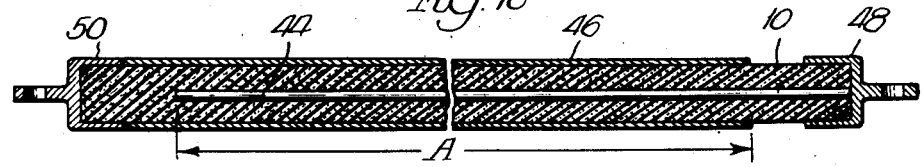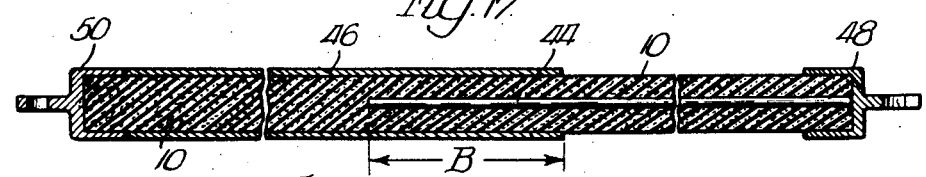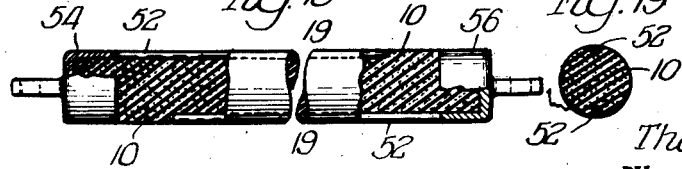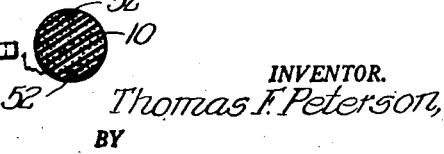

April 23, 1957 T. F. PETERSON 2,790,053
SHIELDED IGNITION CABLE AND RESISTORS
Filed Dec. 27, 1951 3 Sheets-Sheet 3

INVENTOR.
Thomas F. Peterson,
BY
Wilkinson, Huxley, Byron + Hume
ATTYS

United States Patent Office 2,790,053
Patented Apr. 23, 1957

2,790,053

SHIELDED IGNITION CABLE AND RESISTORS

Thomas F. Peterson, Shaker Heights, Ohio

Application December 27, 1951, Serial No. 263,644

2 Claims. (Cl. 201—63)

This invention relates to cable, conductors, or channels for transmission of electric energy, and more particularly to cable in which the electrostatic fields are confined to longitudinally extending walls of insulation.

In my Patent No. 2,322,702, covering shielded cable, various types of conventional conductors and cable are described and a novel method of shielding these is claimed. In general, the electrical insulation has one or more semi-conducting, intimately contacting surface layers at which the electric fields terminate and which carry charging currents to conducting elements, grounds, or the like. In this manner the potentials at all points along the surfaces of the insulation are maintained at values which preclude harmful disturbances. The latter may be of several types, such as ionization of gas developing physical or chemical deterioration of insulation, electrical discharges causing external or internal interference, or non-uniform longitudinal electrostatic capacity effects which may cause disturbances in the transmission characteristics of the cable.

In the attached drawings:

Figures 1 to 5 inclusive represent enlarged fragmentary side elevational views of several forms of conductor which serve to illustrate the present invention;

Figures 6 to 10 inclusive are right sectional views of the constructions shown in Figures 1 to 5 inclusive;

Figures 11 and 12 are fragmentary side elevational and sectional views, respectively, greatly enlarged, of still another embodiment of the present invention in which a core of metalized string is associated with semi-conducting plastic compound;

Figures 13 and 14 correspond to Figures 11 and 12, respectively, of a further modification of the invention;

Figures 15 to 17 are enlarged side elevational and longitudinal sectional views illustrating certain considerations respecting the modifications of Figures 13 and 14;

Figures 18 and 19 are sectionalized side elevational and cross-sectional views, respectively, of a further modification of the principle contained in the constructions of Figures 13 to 17 inclusive.

Figure 20:
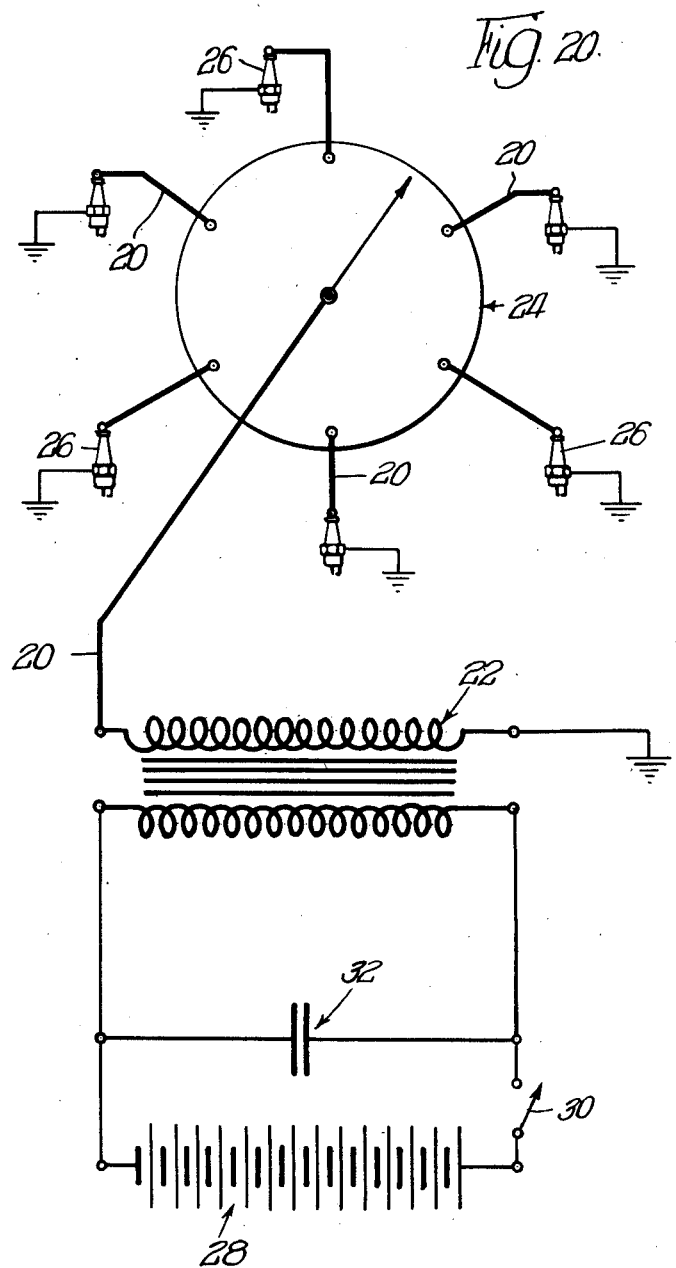
Figure 20 is a schematic plan view of the ignition system of an internal combustion engine.

In one form of internally shielded cable a single conductor 6 in Figures 1 and 6, of copper, steel or similar metal wire or strand, is insulated with conventional insulation 7, such as rubber, wrapped tapes, etc., and on the inner surface of the insulation is a semi-conducting layer 8. The conductor 6 contacts this layer at intervals sufficient to maintain the electrical potential of the layer 8 at a value which precludes ionization of air gaps, discontinuity in longitudinal electrostatic capacity and the like. External shielding may be provided by means of a layer 9 similar to 8, and this layer may be grounded as indicated by an overall grounded metallic braid 12 or the like, or may have its potential fixed by other means (electrostatic coupling) to accomplish the objectives previously mentioned.

One object of this invention is to provide a shielded cable in which the central metallic conductor may be omitted.

Another object is to provide a cable for transmitting small amounts of energy at high voltage and with high longitudinally distributed resistance which will effectively serve to dampen disturbing high frequency oscillations and such.

Still another object is to provide an insulated conductor with extreme flexibility and high longitudinal elasticity.

Another objective is to provide a cable in which internal shielding and longitudinal current carrying members are integral.

Further objects include providing a conductor in which the conductivity or resistivity may be related to its length so that different lengths, as are frequently desirable in spark plug leads, may be provided with equal electrical values, and, conversely, equal lengths may have selected inequalities as regards the electrical properties.

I accomplish these objectives by replacing the metallic conductor element 6 shown in Figure 1 with a non-metallic semi-conducting core of cylindrical or annular form. This core may, e. g., consist of rubber compound rendered semi-conducting or conducting by the incorporation of suitable fillers, such as 50 percent by weight of crude rubber of acetylene black. Such a core 10 of Figures 2 and 7 may be insulated with a layer of similar rubber compound 11 having high insulating values. By the choice of suitable compounds 10 having resistivities of the order of 10 to several hundred ohms per centimeter cube there may be provided cable suitable for use in conventional ignition systems. Typical data obtained on several samples follows:

| Core dia., Inches | O. D., Inches | Core, Ohms/ft. | MMF/ft. Capacity |
|---|---|---|---|
| .052 | .250 | 35,000 | 45.5 |
| .079 | .275 | 18,600 | 47.9 |
| .105 | .275 | 13,800 | 60.4 |
| .121 | .275 | 10,700 | 71.3 |

Such structures have novel characteristics in that they may be used to dampen oscillations in the ignition circuit still providing ample current for spark plug operation. The portion of the core 10 in contact with the insulation 11 provides the type of shielding described in the aforementioned patent. The cable is extremely flexible, elastic and suitable for very high voltage operation. When stretched, despite the increase in length and reduction in cross section area of the core which would ordinarily greatly increase the resistance of the initial length of the cable, the total resistance actually decreases, due perhaps to better contacting of the small particles of carbon within the semi-conducting core. By virtue of this characteristic the structure has added advantages as an indicator of tensile stress or compression. The cable may be used as a resistor and, since the resistance decreases with temperature, it may be used as a temperature indicator. As shown in Figures 3 and 8, the external surface of the insulation may include a semi-conducting layer 13 of the type described in the above patent. Moreover, a central thread 14 may be provided to give some strength during fabrication. This thread may be of any conventional type, such as cotton, rayon, glass, or nonelastic plastic compound, and may be made semi-conducting by impregnation with materials such as Aquadag. After completion, such a structure may optionally be subjected to sufficient tension to break the thread elements 14, thus leaving a very elastic conductor; or the threads may be retained intact to resist the stretching thereof.

Still another construction is that shown in Figures 4 and 9, in which a hollow elastic conducting element 15 makes intimate contact with the inner wall of insulation 16. Outer shielding 17 may be provided. This particular structure may be used for high frequency transmission, in which case it serves as a wave guide.

While mention has been made of the use of semi-conducting or conducting rubber in this invention, other synthetic rubber compounds, elastomers may be used. In certain cases the insulation 16 may be of any suitable conventional type and the layers 15 and 17 may be formed of semi-conducting lacquers, paints, etc. as an example of these, see my Patent No. 2,446,387.

In order to reduce longitudinal resistance per foot and to provide facilities for suitably contacting the semi-conducting, short interrupted sections of metallic elements 18, Figures 5 and 10, may be provided. Longitudinal conduction will then be largely along these elements, thence into the conducting core into the next conducting element. These elements may be short sections of copper tinsel or equivalent wires.

In Figure 11 provision is made for a core of string or other type of corded non-conductor 40, in the strands of which are incorporated more or less continuous lengths of metallic filaments 42 which in unbroken or contiguous lengths serve as conductors of low resistance values. Strings or cords of the kind here contemplated are those commonly used for decorative purposes, as in Christmas wrappings, etc., where the brilliant tinseled appearance is imparted to common string by incorporation of metal tinsel filaments in the corded structure. Of course, the size of the parts shown in Figure 11 is greatly enlarged and exaggerated for purposes of illustration. Such a corded structure is embedded in a semi-conductor 10 similar to that previously discussed, and the conductor is provided with an overall covering 11 of suitable insulation. In this construction, since both the semi-conductor 10 and the insulation 11 are flexible and elastic, the core element serves as a tension member to resist stretching of the conductor, and also serves as a means by which the resistance of the conductor is greatly reduced by virtue of the conductivity of the metallic filaments 42 extending therethrough.

Where it is desirable to increase the resistance of unit lengths of such a conductor, it is only necessary to stretch the latter until some or all of the metallic filaments 42 are disrupted, either with or without a partial or complete failure of the cordage strands 40. In this respect, it should be recognized that, whereas there is a substantial degree of resilience in a cordage structure similar to that here employed, there is practically no stretch to metallic filaments such as the tinsel-like elements 42 incorporated therein. Therefore the cord may be stretched, bent and twisted, to cause more or less disruption of the metallic filaments, which, in turn, causes more or less increase in overall resistance of the conductor.

Where separate conductors of unequal length are required to have essentially the same overall resistance value, the short lengths may be worked to disrupt the metallic filaments of the cord to a greater extent than those of the longer lengths of conductor, so that the shorter lengths and the longer lengths will correspond in electrical values.

There is shown in Figures 13 to 19, inclusive, a modification of the present invention, by which the conductivity of a conductor made in accordance with this invention, or its reciprocal, the resistance thereof, may be controlled to afford a substantially constant value for separate conductors of unequal length; or, conversely, may provide different electrical values for equal lengths of conductor.

As shown in Figures 13 and 14, a metallic core 44 is concentrically disposed in the semi-conducting mass 10, which in turn is encased in a conductive covering 46 of helical wires, braid, wire mesh, or conductive tape.

As appears in Figures 15 to 17, the central conductor 44 is electrically connected to one terminal 48, while the outer conductor 46 is electrically connected to the opposite terminal 50. The core 44 and the outer covering 46 terminate short of the opposite terminals, respectively, and the electrical path is completed through the semi-conducting material 10, as appears in these figures.

Obviously, in such an arrangement, the flow of current is radial from the central conductor to the covering, or vice versa, and the degree of conductivity or resistance realized from such an arrangement is proportional to the extent by which the conductors 44 and 46 overlap each other. Thus, in Figure 16, where the overlap is substantial, as is indicated by the dimension A, a relatively good conductor of low resistance is provided; while in that of Figure 17, in which the overlap is reduced to some dimension B, a conductor of higher resistance is afforded. Therefore, by regulating the degree of overlap of these conductors, the conductance or resistance of the conductor may be selectively controlled, and where it is desired, conductors of unequal lengths may be provided with substantially the same electrical values overall by the application of this teaching.

A variation of this is shown in Figures 18 and 19, in which a semi-conducting body 10 has embedded upon its opposite surfaces two or more conductors 52, which may be embedded in the semi-conductor 10 in balanced relation as regarded in right section. Alternate conductors connect with opposite terminals, so that the upper conductor in Figure 18 is electrically connected to the terminal 56, both terminals being connected by the semi-conductor 10. Such conductor 52 falls short of the opposite terminal by a distance not less than the space between conductors considered in right section, so that the circuit is completed through the semi-conductor. Here, again, the flow of current through the semi-conductor 10 is along relatively diametric paths between overlapping portions of the conductors 52, and the extent of the conductivity or resistance of the overall conductor may be varied in accordance with the extent of the overlap in the same manner as that described in connection with the preceding figures. It is obvious that where two diametrically opposed conductors 52 are employed as shown in Figure 19, the semi-conductor may be flattened into a strip or tape having good conductors mounted at or adjacent its edges in parallel relation. It is also obvious that the good conductors 52 may be buried within the semi-conducting mass in any of these embodiments so as not to appear on the surface thereof.

In Figure 20 flexible conductors 20 made in accordance with the present invention are represented as extending between a spark coil 22 of the conventional ignition circuit of an internal combustion engine and the distributor 24, and between the points of the distributor 24 and the spark plugs 26. The circuit is energized by a battery 28 in the primary circuit of the coil 22, which is controlled through an ignition switch 30, and in which a condenser 32 may be employed.

In general, rubber compounds loaded with suitable carbon black to provide conducting characteristics also exhibit good thermal characteristics in many cases twice as good as an equivalent insulating stock. This feature has an advantage, since it allows for better distribution of heat in a structure which may, when carrying sufficiently high currents, be a generator of heat.

Synthetic rubber—Buna S, butyl, neoprene, Thiokol—compounds with suitable amounts of carbon, serve as semi-conducting layers and provide added advantages such as oil resistance, resistance to oxidation, etc. Where thermoplasticity is not objectional, semi-conducting plasticized resins may be formed by incorporating approximately 30 percent to 50 percent by weight of carbon, such as acetylene black, in the plasticized resin, such as Koroseal (poly vinyl chloride), Vinylite (copolymer of vinyl chloride and vinyl acetate) polymerized styrene, etc. These layers may be formed by extrusion under and over the insulating wall which may be a similar insulating plastic, or by taping, strip covering or coating from solutions of the semi-conducting resin.

Other applications for this structure will be obvious e. g., it may serve as a hair curler in which use the high resistance core serves as a source of heat and the elastic characteristics of the structure are essential to suitable operation.

I claim:

1. A conductor for use in electric ignition systems to dampen oscillations comprising an elongated semi-conductive body of flexible, elastic plastic material having non-metallic conductive particles disseminated throughout its mass, and a core in said body having non-conductive cordage strands with a plurality of broken lengths of metallic conductive elements for reducing the total resistivity of said conductor.

2. A conductor for use in electric ignition systems to dampen oscillations comprising an elongated semi-conductive body of flexible, elastic plastic material having non-metallic conductive particles disseminated throughout its mass, and a core in said body containing a plurality of broken lengths of spaced metallic conductive elements for reducing the total resistivity of said conductor.

References Cited in the file of this patent

UNITED STATES PATENTS

| | | |
|---|---|---|
| 1,994,128 | Foust | Mar. 12, 1935 |
| 2,161,605 | Yolles | June 6, 1939 |
| 2,322,702 | Peterson | June 22, 1943 |
| 2,322,773 | Peters | June 29, 1943 |
| 2,429,401 | Davis | Oct. 21, 1947 |
| 2,563,952 | Nichol | Aug. 14, 1951 |

FOREIGN PATENTS

| | | |
|---|---|---|
| 983,753 | France | June 27, 1951 |